United States Patent [19]

Goncalves et al.

[11] Patent Number: 5,070,768

[45] Date of Patent: Dec. 10, 1991

[54] ARTICULATED PISTON

[75] Inventors: Victor A. M. D. Goncalves; Jose M. M. Leites, both of Sao Paulo, Brazil

[73] Assignee: Metal Leve S.A., Sao Paulo SP, Brazil

[21] Appl. No.: 378,602

[22] Filed: Jul. 11, 1989

[30] Foreign Application Priority Data

Jul. 15, 1988 [BR] Brazil ................................ 8803970

[51] Int. Cl.⁵ ............................................ F01B 31/10
[52] U.S. Cl. ........................................ 92/159; 92/186;
123/41.35
[58] Field of Search ............................ 92/186–190, 92/158, 159, 160, 219; 123/41.35, 41.38, 41.39, 41.33

[56] References Cited

U.S. PATENT DOCUMENTS

| 1,783,477 | 12/1930 | Mansfield | 92/160 |
|---|---|---|---|
| 2,442,408 | 6/1948 | Graham | 123/176 |
| 3,613,521 | 10/1971 | Itano | 92/186 |
| 3,930,472 | 1/1976 | Athenstaedt | 92/186 X |
| 4,044,731 | 8/1977 | Lindner | 92/186 X |
| 4,056,044 | 11/1977 | Kamman et al. | 123/41.35 X |
| 4,180,027 | 12/1979 | Taylor | 123/41.35 |
| 4,286,505 | 9/1981 | Amdall | 92/186 |
| 4,372,194 | 2/1983 | Vallaude | 92/176 |
| 4,644,853 | 2/1987 | Russell et al. | 92/190 |
| 4,662,319 | 5/1987 | Ayoul | 123/41.35 |

FOREIGN PATENT DOCUMENTS

| 17740 | 10/1959 | Fed. Rep. of Germany . |
|---|---|---|
| 3241343 | 7/1983 | Fed. Rep. of Germany . |
| 26424 | 8/1979 | Japan . |
| 156052 | 9/1982 | Japan . |
| 617224 | 3/1949 | United Kingdom . |
| 1558393 | 1/1980 | United Kingdom . |

OTHER PUBLICATIONS

Dubbel, Tashunbuch fur den Maschinenbau, 1987, Seiten G82–83 (no month).

Primary Examiner—Edward K. Look
Assistant Examiner—Thomas Denion
Attorney, Agent, or Firm—Darby & Darby

[57] ABSTRACT

A two-piece piston composed of independent head and skirt portions, wherein the skirt portion is mounted by means of a wrist pin on bosses located on the lower end of members pending from the head portion, the head portion being provided with an annular recess between the combustion bowl and the ring zone, and the skirt provided with a tray on its upper end, the annular recess and the tray defining a semi-open cooling chamber. With the piston assembled, the lower end of the head portion below the ring zone and the upper end of the skirt portion, which constitutes the outer wall of the tray, define an oil baffle designed to prevent the cooling oil from flowing from the tray toward the space between the piston and the cylinder.

3 Claims, 3 Drawing Sheets

ARTICULATED PISTON

BACKGROUND OF THE INVENTION

This invention relates to two-piece pistons for internal combustion engines. Particularly, the invention relates to a piston of the articulated type intended primarily for diesel engines.

In the present days there is a growing tendency toward the use of articulated, or two-piece, pistons on diesel engines. In the articulated piston the head and the skirt are independent members: the skirt is assembled by means of a wrist pin on bosses located at the lower end of members depending from the head. With the piston fitted in the cylinder there is no contact between the head and the skirt portions. The basic feature of the articulated piston is that its components perform independent functions: the head, provided with the ring zone, bears the pressure of the combustion gases, while the skirt functions as a guide of the piston in the cylinder and supports the side loads transmitted by the inclination of the connecting rod.

The mounting of this type of piston in the cylinder can be made with small clearances due to the use of ferrous metals, which have a lower coefficient of thermal expansion, approximately that of the cylinder liner, which favors a better piston ring stability owing to a smaller lateral movement of the piston, thereby affording a lower lubricating oil consumption and a reduction of blow-by. Moreover, the absence of contact between the skirt and the head results in a reduced temperature on the skirt, thereby affording smaller mounting clearances and accordingly a decrease of the piston noise level.

Generally, the top portion, or head, of articulated pistons is made of a ferrous metal which is more resistant to the high thermal and mechanical loads, the skirt being generally of a cast or forged aluminum alloy. The use of a ferrous metal for the head affords placing the upper compression ring groove very close to the piston top, which would be virtually impracticable on conventional aluminum alloy pistons.

On high output diesel engines, the high temperatures on the piston top, especially on the ring zone and combustion chamber, make these areas extremely susceptible to problems. On the ring zone, very high temperatures may cause an excessive and early wear of the upper compression ring groove, degradation of the lubricating oil, build-up of carbon deposits and ring sticking. On the combustion chamber, these problems are represented by thermal cracks which tend to propagate and ultimately cause a breakage of the piston top. Therefore, it is necessary to provide a decrease of temperature of these regions in order to solve this problem.

One well-known approach to effect this cooling on articulated pistons (see U.S. Pat. No. 4,180,027 to Taylor) is to provide the upper portion of the skirt, next to the head lower portion, with a tray, and the head region, between the central portion and the ring zone, with a recess, in such a fashion that the tray and the recess define a semi-open chamber for circulation of the cooling oil which is supplied into the chamber by means of an injection nozzle. The reciprocating motion of the piston causes the cooling oil in the chamber to make a movement known as cocktail shaker, thereby removing part of the heat of the ring zone and combustion chamber portions, thus reducing the temperature of said regions. The heated oil exits the cooling chamber through one or more holes located at suitable points, at the same time that a quantity of fresh oil is fed into the chamber, thus defining a continuous circulation of coolant.

During the ascending and descending travel of the piston, inertia phenomena arising out of deceleration and acceleration forces cause a part of the oil injected into the chamber to be retained on the piston bottom, i.e., on the lower portion of the combustion chamber. As soon as the action of such inertial forces ceases, a great portion of the cooling oil until then retained drops or flows into the tray on the top of the skirt. Together with this cooling oil the quantity of the oil fed by the injection nozzle also into the tray is ultimately higher than the tray capacity, causing part of the excess oil to overflow the inner wall of the tray into the crankcase. However, part of the excess oil overflows the outer wall of the tray and passes toward the cylinder through the opening between the head and the skirt. This excess oil, which is then trapped between the piston skirt and the cylinder, results in an overwork of the oil control ring which cannot prevent part of the oil from reaching the piston top land where it is then burned in the combustion process. This brings about a higher lubricating oil consumption, the build-up of carbon deposits on the top land and a higher level of emissions, especially of particulate matter.

OBJECTS OF THE INVENTION

With a view to minimizing these problems, applicant devised and developed a solution to keep the cooling oil from escaping in the direction of the cylinder. It is, therefore, the object of the present invention to provide a two-piece, or articulated, piston wherein the lower end of the head and the upper end of the skirt are shaped in such a manner as to define a baffle designed to render difficult the exit of cooling oil through the gap between the head and the skirt.

BRIEF DESCRIPTION OF THE DRAWINGS

The object of the present invention is illustrated in the accompanying drawings where.

DETAILED DESCRIPTION OF THE INVENTION

Figure 1:
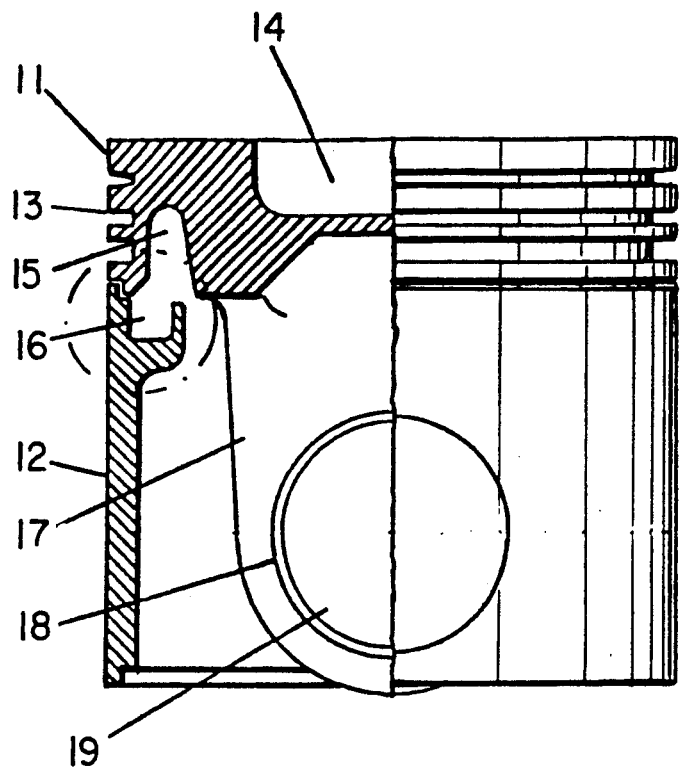
FIG. 1 is a partial longitudinal cross section of the two-piece piston of the invention.

In one exemplary embodiment, illustrated in FIG. 1, a two-piece, or articulated, piston is composed of a head portion 11, provided with a ring zone 13, a combustion bowl 14 and a recess 15 between the ring zone 13 and the combustion bowl 14. A skirt portion 12 is provided on its upper region with a tray 16. The recess 15 on the head and the tray 16 on the skirt define a semi-open cooling chamber.

Figure 2:
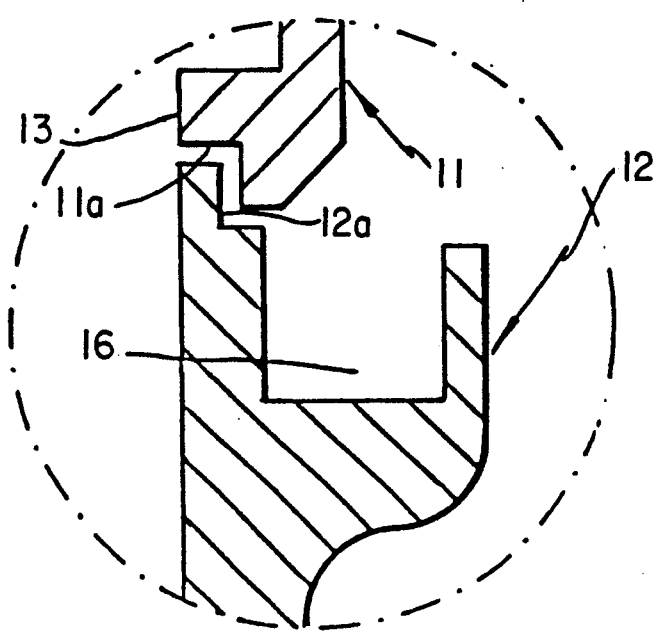
FIG. 2 is an enlarged view of the configuration of the lower end of the head and the upper end of the skirt of the two-piece piston depicted in FIG. 1

Also formed as an integral part of the head 15 are two members 17 with bosses 18 for bearing the wrist pin 19. The skirt 12 is mounted on the bosses 18 by means of the wrist pin 19. In this embodiment, as illustrated in the enlarged detail of FIG. 2, the lower end of the head 11 is indented on the outer part thereby forming a step 11a, and the upper end of the skirt 12 is indented on the inner part, forming also a step 12a, however in an inverted position in relation to the step on the head portion. Thus, with the piston assembled the steps 11a, 12a in inverted position in relation to each other are positioned in such a fashion that the projection of one portion fits into the notch on the other portion, thereby defining an approximately Z-shaped baffle which renders difficult the flow of the oil from the tray 16 to the cylinder through the gap between the head and skirt of the piston.

Figure 3:
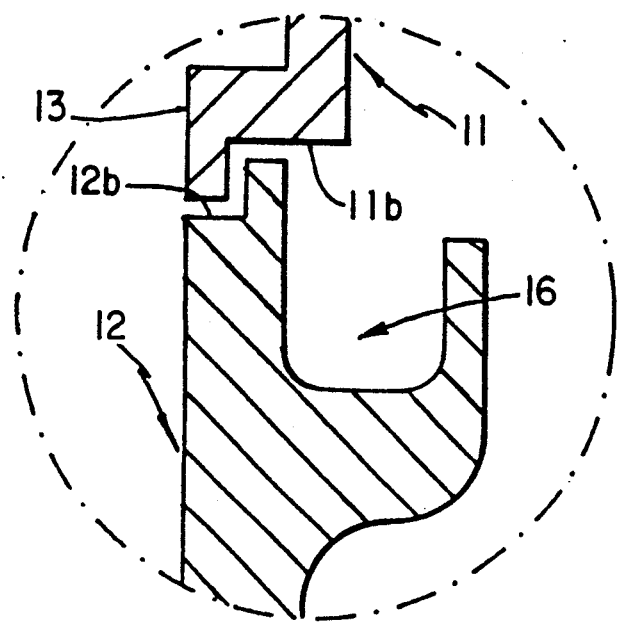
FIG. 3 through 6 are enlarged detail views of several alternative configurations of the lower end of the head and the upper end of the skirt of the two-piece piston shown in FIG. 1.

In the alternative embodiment illustrated in FIG. 3, the lower end of the head 11 is cut on the inner part with a shoulder 11b and the upper end of the skirt 12 is indented with a recess 12b on the outer part. In this embodiment, the baffle has an approximately inverted Z shape between shoulder 11b and recess 12b.

Figure 4:
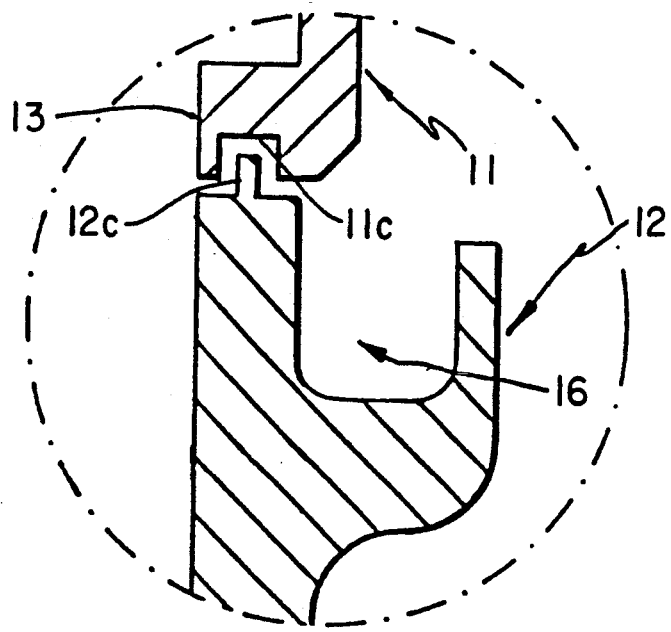
Figure 5:
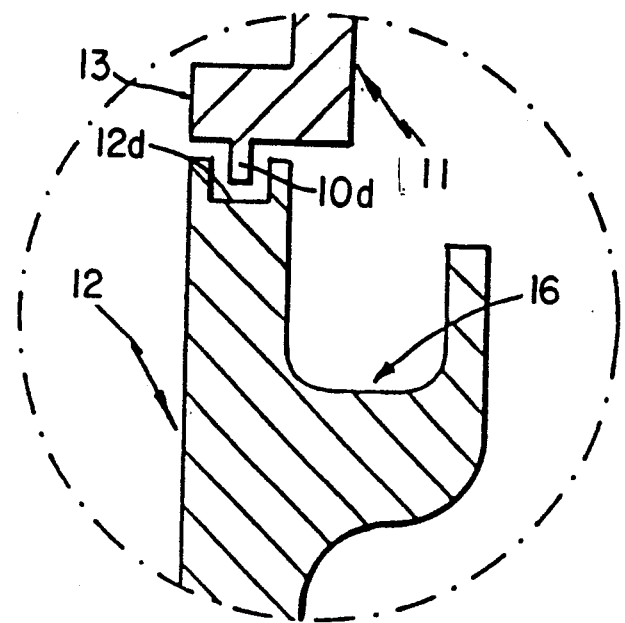

FIGS. 4 and 5 depict two additional alternative embodiments. In FIG. 4, the upper end of the skirt 12 is provided with a upwardly extending projection which mates with an annular recess 11c provided on the lower end of head 11.

In FIG. 5, the lower end of head 11 has the shape of a downwardly extending projection 11 d which mates with an annular recess 12d provided on the upper end of the skirt 12.

Figure 6:
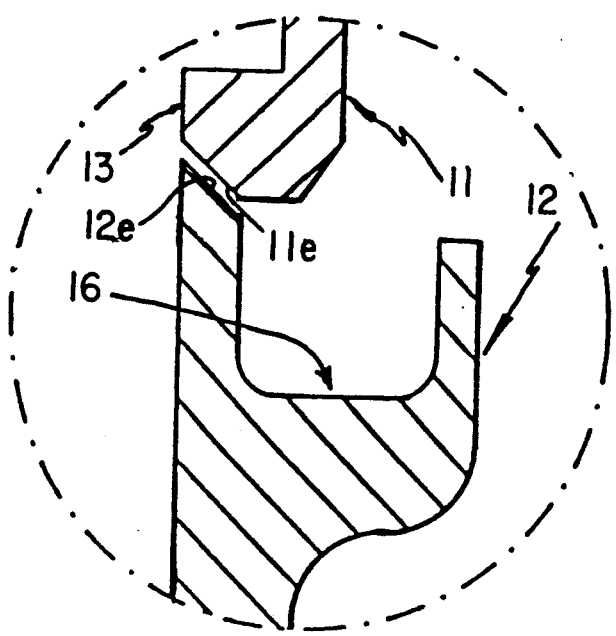

FIG. 6 illustrates still another embodiment, wherein the lower end of the head 11 and the upper end of the skirt 12 are provided with opposed chamfers 11e, 12e sloping downwards toward the piston inner portion and parallel to each other. In this embodiment, the absence of a baffle is compensated by the hydrodynamic pressures developed within the space defined by the piston, the oil control ring and the cylinder liner, which urges the oil retained in that space toward the gap between the head and the skirt, thereby counteracting the flow of oil from the tray 16 to the cylinder.

The recesses and projections are dimensioned in such a manner as not to allow a contact between the head and the skirt during the engine operation. The configuration of the indentations as defined in the embodiments are exemplary and not restrictive. It is intended that any configuration fitting into the principle and scope of the proposal be covered by the present invention.

We claim:

1. A cooled two-piece piston comprising:
   independent head and skirt portions, with an open space between the lower end of the head and the upper end of the skirt, wherein the inner part of the head portion is provided with an annular recess between the combustion bowl and the ring zone, and the skirt is provided on the internal wall of its top portion with an annular peripheral tray for containing cooling oil, the outerwall of the tray being the skirt, the head annular recess and the tray forming a semi-open cooling chamber; one of the lower end of said head portion, below the ring zone, and the upper end of said skirt portion having a notch defined by a wall and the other having a projection which mates with each other, at least one said mating notch and projection extending above the tray on the skirt internal wall, and forming a baffle to the oil travelling from the tray toward the open space to reduce the amount of oil exiting through said open space between the head and the skirt.

2. A cooled two-piece piston according to claim 1, wherein each of the skirt and the head has a notch and projection with the projection of one fitting into the notch of the other to form the baffle.

3. A cooled two-piece comprising:
   independent head and skirt portions, with an open space between the lower end of the head and the upper end of the skirt, wherein the inner part of the head portion is provided with an annular recess between the combustion bowl and the ring zone, and the skirt is provided on the internal wall of its top portion with an annular peripheral tray for containing cooling oil, the outerwall of the tray being the skirt, the head annular recess and the tray forming a semi-open cooling chamber; the lower end of said head portion, below the ring zone, and the upper end of said skirt portion having chamfers parallel to each other with slope downward from the piston external surface forming a baffle to the oil travelling from the tray toward the open space to reduce the amount of oil exiting through said open space between the head and the skirt.

* * * * *

UNITED STATES PATENT AND TRADEMARK OFFICE
CERTIFICATE OF CORRECTION

PATENT NO. : 5,070,768
DATED : December 10, 1991
INVENTOR(S) : Victor A.M.D. Goncalves, et al It is certified that error appears in the above-indentified patent and that said Letters Patent is hereby corrected as shown below:

In the cover page of the patent, item (73), please delete "Metal Leve S. A." and substitute therefor --METAL LEVE S.A. INDÚSTRIA E COMÉRCIO--.

Signed and Sealed this

Twenty-seventh Day of September, 1994

Attest:

BRUCE LEHMAN

Attesting Officer

Commissioner of Patents and Trademarks